United States Patent [19]

Ishida et al.

[11] Patent Number: 5,107,575
[45] Date of Patent: Apr. 28, 1992

[54] HEAT EXCHANGER AND METHOD OF MANUFACTURING THE SAME

[75] Inventors: Minoru Ishida, Matto; Toshio Isobe, Ishikawa, both of Japan

[73] Assignee: Asahi Kasei Kogyo Kabushiki Kaisha, Japan

[21] Appl. No.: 594,689

[22] Filed: Oct. 9, 1990

Related U.S. Application Data

[63] Continuation of Ser. No. 341,398, Apr. 21, 1989, abandoned.

[30] Foreign Application Priority Data

| | | |
|---|---|---|
| Apr. 25, 1988 [JP] | Japan | 63-100106 |
| Apr. 25, 1988 [JP] | Japan | 63-100107 |
| May 30, 1988 [JP] | Japan | 63-130093 |
| May 30, 1988 [JP] | Japan | 63-130094 |
| Jun. 3, 1988 [JP] | Japan | 63-135683 |
| Sep. 9, 1988 [JP] | Japan | 63-224707 |

[51] Int. Cl.$^5$ .................. B21F 21/00; B21C 37/26
[52] U.S. Cl. .................. 29/89.048; 165/152; 165/183; 165/184
[58] Field of Search ............ 165/152, 153, 183, 184, 165/185; 29/890.048, 890.046

[56] References Cited

U.S. PATENT DOCUMENTS

| | | | |
|---|---|---|---|
| 2,268,680 | 1/1942 | Linde | 29/890,048 |
| 2,711,382 | 6/1955 | Smith-Johannsen | 29/890,046 |
| 3,397,440 | 8/1968 | Dalin | 165/183 |
| 4,936,379 | 6/1990 | Hoshino et al. | 165/153 |
| 4,955,525 | 9/1990 | Kudo et al. | 165/153 |

FOREIGN PATENT DOCUMENTS

149198 3/1955 Sweden .................. 165/185

Primary Examiner—Albert W. Davis, Jr.
Attorney, Agent, or Firm—Finnegan, Henderson, Farabow, Garrett & Dunner

[57] ABSTRACT

A pin-fin type heat exchanger comprising a plurality of wire-like heat conductive elements arranged in parallel and spaced from each other, and formed into a corrugated shape, and a method of manufacturing the same by making a corrugated sheet including the wire-like heat conductive elements and a temporary fixing material and removing the temporary fixing material after the heat conductive element is joined to a pipe through which fluid passes.

9 Claims, 18 Drawing Sheets

Fig. 1A PRIOR ART   Fig. 1B
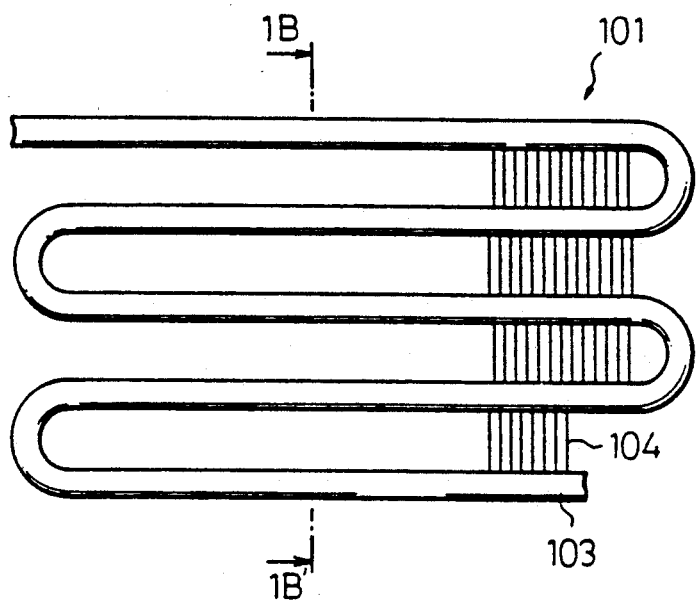
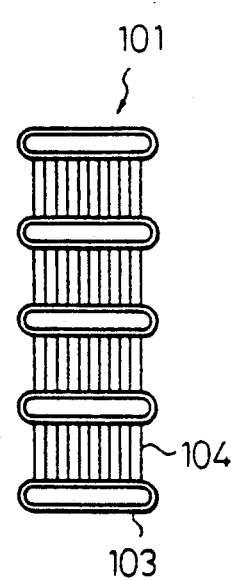
Fig. 2 PRIOR ART
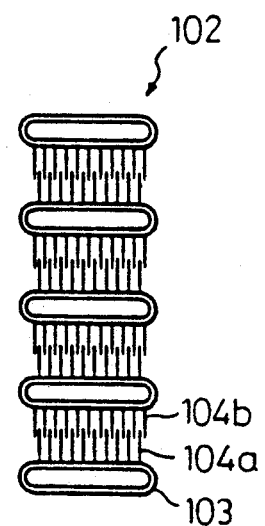

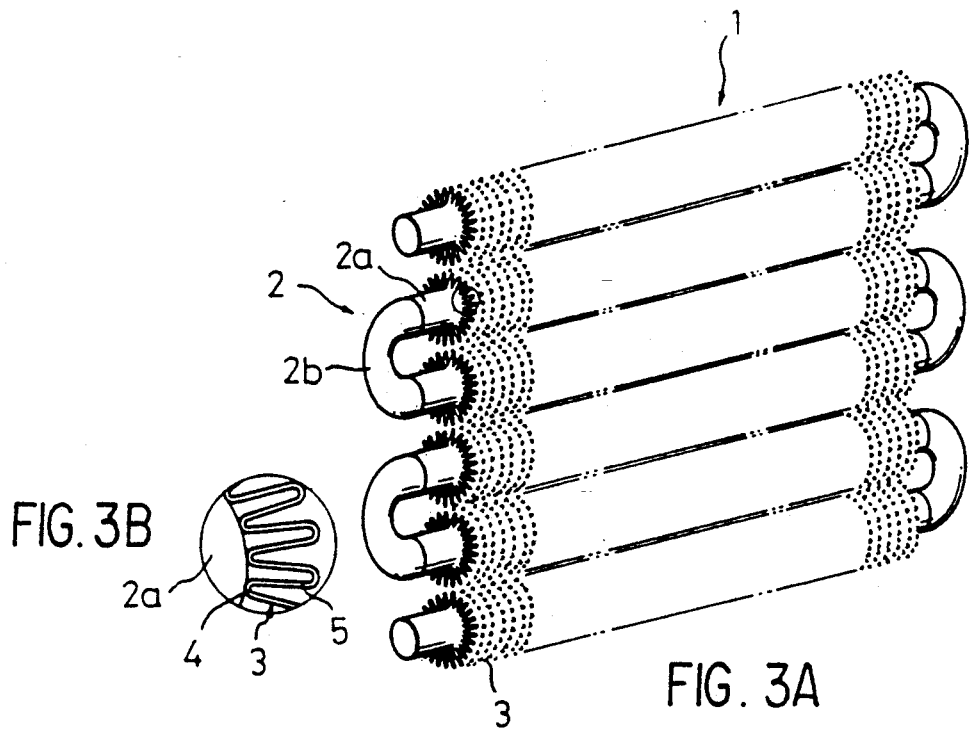
FIG. 3B
FIG. 3A
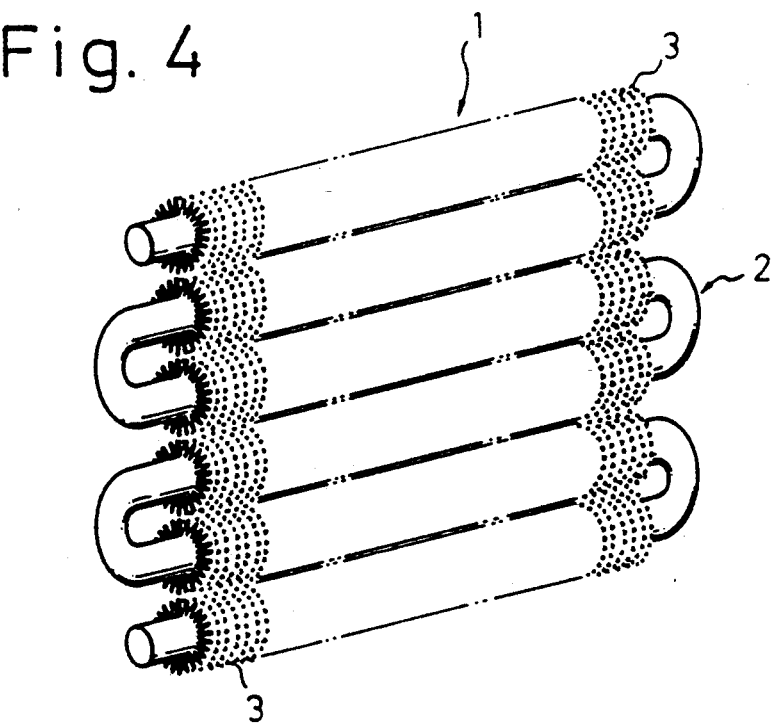
Fig. 4

HEAT EXCHANGER AND METHOD OF MANUFACTURING THE SAME

This application is a continuation of application Ser. No. 341,398, filed Apr. 21, 1989 now abandoned.

BACKGROUND OF THE INVENTION

1. Field of the Invention

The present invention relates to a heat exchanger and a method of manufacturing the heat exchanger. More particularly, the present invention relates to a pin-fin type heat exchanger having an excellent heat transfer efficiency and a method of manufacturing same.

2. Description of the Related Art

It is known to provide a fin around a pipe through which a fluid is passed, to improve a heat transfer efficiency between a fluid passing through the pipe and a fluid passing over the pipe in a heat exchanger. Usually, a plate-like fin is used and is formed on the pipe by winding the plate in a spiral or a ring around the pipe. When the heat exchanger equipped with the plate-like fin is used, a boundary layer of air is generated on a surface of the plate-like fin and this boundary layer remains on the surface of the plate to form a heat insulating barrier and thus it is impossible to obtain a high heat transfer efficiency with this heat exchanger.

To solve this problem, various improvements such as providing a louver or the like, made by providing a hold(s) in the plate-like fin to increase the heat transfer efficiency have been proposed, as disclosed in, for example, Japanese Unexamined Patent Publication (Kokai) No. 56-155391.

A heat exchanger 101 having a plurality of metal pins 104 fixed between two adjacent pipes 103, as shown in FIG. 1(A) and FIG. 1(B), and a heat exchanger 102 provided with a plurality of metal pins 104a and 104b having one end fixed on a pipe 103 and the other end protruded toward an adjacent pipe 103, as shown in FIG. (2), is disclosed in Japanese Unexamined Utility Model Publications 55-145284 and 57-172283. With this method, a heat transfer area of the fins per unit volume of the heat exchanger can be enlarged by increasing the density of the pins on a surface of the pipe through which the fluid passes, and thus the heat exchanging efficiency is increased. Nevertheless, this heat exchanger has a disadvantage in that a pressure loss of a fluid passing around the pipes is increased when the density of the pins is increased. Further, the work necessary to fix the pins on the surfaces of the pipes is cumbersome and requires much time.

SUMMARY OF THE INVENTION

A primary object of the present invention is to provide a novel pin-fin type heat exchanger capable of reducing a pressure loss of a fluid passing around the pipe and increasing a heat transfer efficiency of the heat exchanger.

A second object of the present invention is to provide a method by which the above pin-fin type heat exchanger is efficiently manufactured.

The first object of the present invention is realized by a pin-fin type heat exchanger comprising a pipe through which a fluid flows and a fin arranged on a circumferential surface thereof, wherein the fin is comprised of a plurality of wire-like heat conductive elements arranged in parallel and spaced from each other, the wire-like heat conductive elements have a corrugated shape formed by bending the heat conductive elements in a lengthwise direction, and curved tops arranged at at least a side of the corrugated heat conductive elements are fixed to the pipe.

A preferable method of manufacturing the pin-fin type heat exchanger having corrugated pin fins is a method which includes the following sequential steps:

a step of arranging a plurality of wire-like heat conductive elements in parallel and spaced from each other;

a step of temporarily fixing the plurality of wire-like heat conductive elements in the above arranged state to form a sheet constituted by the wire-like heat conductive elements and a temporary fixing material;

a step of treating the sheet in a corrugated state;

a step of joining curved tops of the wire-like heat conductive elements applied on at least a side of the corrugated sheet to the pipe; and a step of removing the temporary fixing material.

BRIEF DESCRIPTION OF THE DRAWINGS

FIG. 1(A) is a schematical front view of an example of a conventional pin-fin type heat exchanger;

FIG. 1(B) is a sectional view of the heat exchanger illustrated in FIG. 1(A), taken along the lines 1B and 1B';

FIG. 2 is a sectional view of another example of the conventional pin-fin type heat exchanger;

FIG. 3 is a perspective view of an embodiment of a pin-fin type heat exchanger in accordance with the present invention;

FIG. 4 is a perspective view of another embodiment of the pin-fin type heat exchanger in accordance with the present invention;

DESCRIPTION OF THE PREFERRED EMBODIMENTS

Figures 5A, 5B:
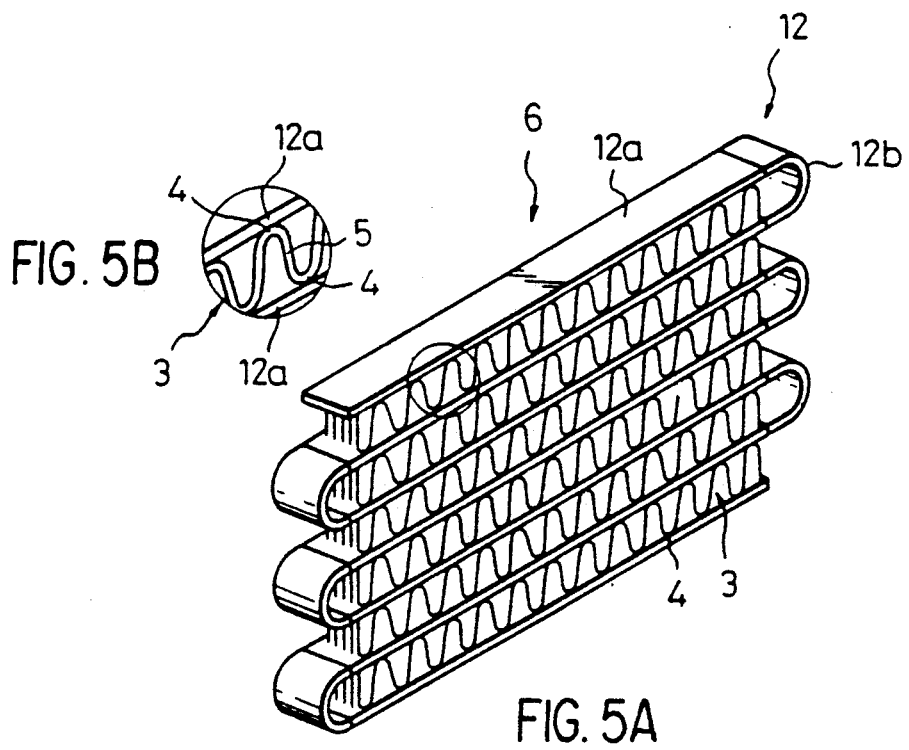
FIG. 5 is a perspective view of a further embodiment of the pin-fin type heat exchanger in accordance with the present invention.

The present invention will now be described in detail with reference to the accompanying drawings illustrating embodiments of a pin-fin type heat exchanger and a method of manufacturing the pin-fin type heat exchanger in accordance with the present invention.

FIG. 3 illustrated an embodiment of a pin-fin type heat exchanger in accordance with the present invention.

As shown in FIG. 3, the heat exchanger 1 includes a pipe 2 formed in a S-like shape, and composed of several straight pipe portions 2a arranged in parallel to each other and U-shape pipe portions 2b connecting alternate ends of the straight pipe portions 2a. Wire-like heat conductive elements 3 bent in a corrugated shape in a lengthwise direction are arranged over almost the entire area of the pipe portion 2a, and a curved tops 4 at one side of the wire-like heat conductive elements 3 having a corrugated shape are fixed to surfaces of the pipe 2 through which a fluid passes.

As shown in FIG. 4, a pipe formed by bending piping into an S-like shape can be used in place of the pipe 2 illustrated in FIG. 3. Further, a pipe 2 having a cylindrical shape, as illustrated in FIGS. 3 and 4, may be used, and as shown in FIG. 5, a pipe 12 composed of several straight flat pipes 12a and flat pipes 12b may be used. A pipe assembly composed of the pipes 2 and the pipes 12 also may be used.

The heat exchanger shown in FIGS. 3 and 4 is mainly used as a shell and tube type heat exchanger, and the total area of fins of this heat exchanger can be remarkably enlarged compared with a conventional heat exchanger equipped with an ever-fin or the like. When this heat exchanger is used to transfer heat from boiling water, the foam maintaining ability of foam generating nucleus is very good, and thus the heat transfer efficiency is increased.

Figure 6A:
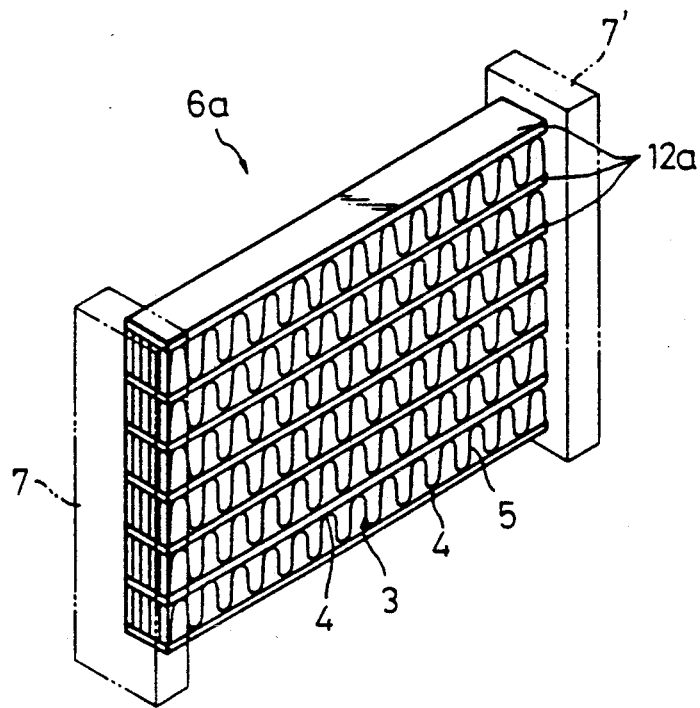
FIG. 6(A) is a perspective view of another embodiment of the pin-fin type heat exchanger having a constitution similar to that of the heat exchanger illustrated in FIG. 5, but equipped with a pair of headers.
Figure 6B:
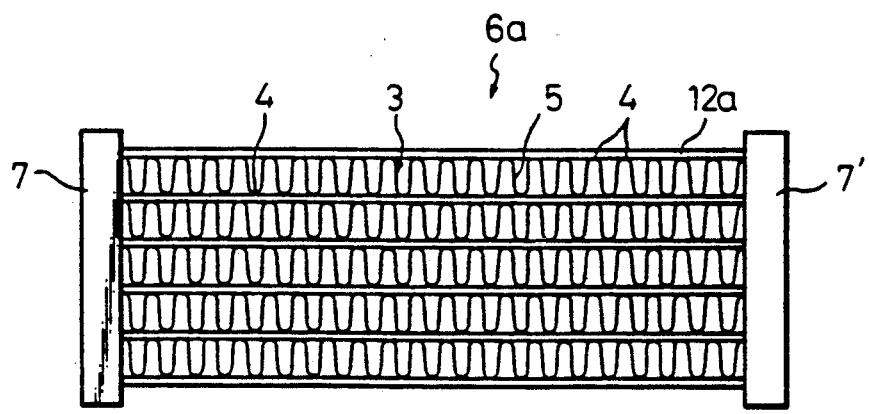
FIG. 6(B) is a front view of the heat exchanger illustrated in FIG. 6(A)

Another embodiment of the heat exchanger in accordance with the present invention is illustrated in FIGS. 6(A) and 6(B). As shown in FIGS. 6(A) and 6(B), in this heat exchanger 6a, a plurality of straight pipes 12a having a flat section are arranged in parallel and spaced from each other, and both ends of the straight pipes 12a are supported in headers 7 and 7' through which a fluid can be passed from one of the straight pipes 12a to another straight pipe 12a. Each of the spaces between adjacent straight pipes 12a is provided with a wire-like heat conductive element 3 formed in a corrugated shape. The corrugated heat conductive element 3 comprises a curved top 4 and a straight portion 5. The curved tops 4 of both sides of the corrugated heat conductive element 3 are fixed to the surface of the pipe 12a. Note, although only one of the corrugated wire-like heat conductive elements 3 is illustrated in FIG. 6(A) and 6(B), a plurality of corrugated wire-like heat conductive elements 3 are arranged in parallel and spaced from each other behind the corrugated wire-like heat conductive element 3 shown in the drawings, and are fixed to the pipes 12a, respectively.

This piling type heat exchangers can be applied to a domestic cooler, a car cooler or the like and can be made very compact compared with a conventional heat exchanger equipped with plate-fins.

Figure 7:
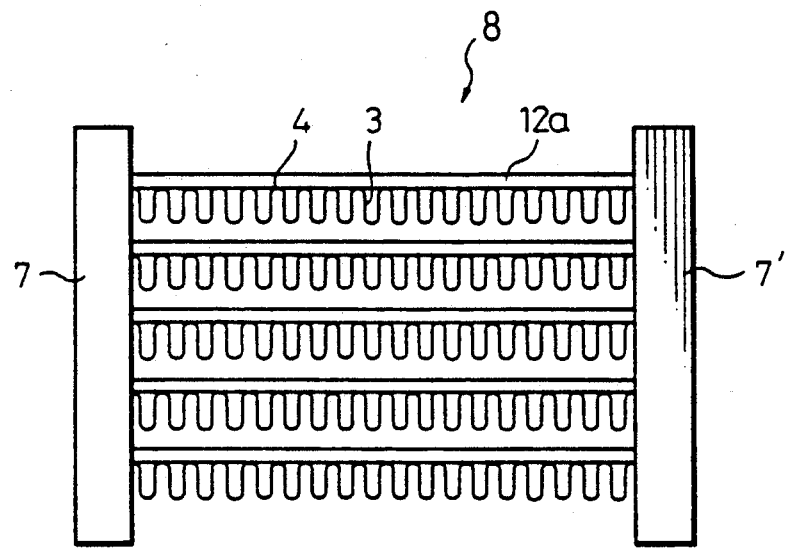
FIG. 7 is a front view still another embodiment of the pin-fin type heat exchanger in accordance with the present invention.
Figure 8:
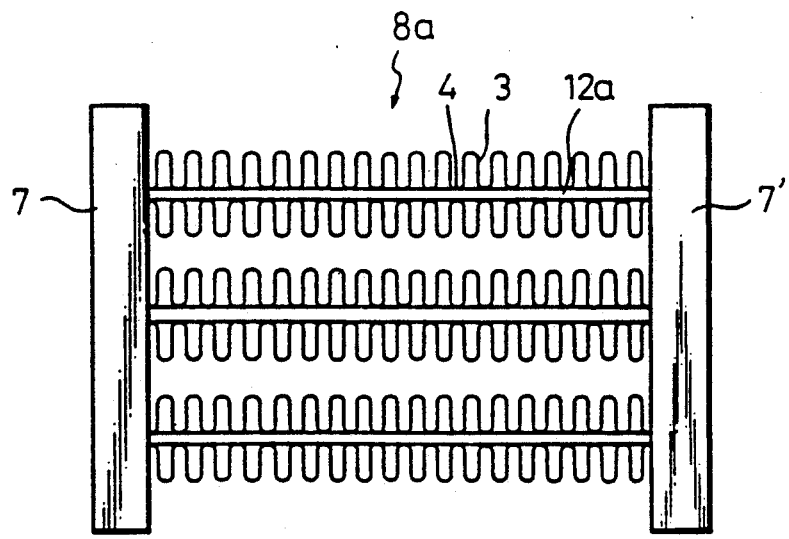
FIG. 8 is a front view of a modification of the pin-fin type heat exchanger illustrated in FIG. 7.

The curved tops 4 at both sides of the corrugated heat conductive elements 3 are fixed to the surface of the pipe 12a in the heat exchanger 6a illustrated in FIG. 6(A) and 6(B), the curved tops 4 at one side of a corrugated heat conductive element 3 are fixed to a surface at a side of a pipe 12a in a heat exchanger 8 illustrated in FIG. 7 respectively, and the curved tops 4 at each side of two corrugated heat conductive elements 3 are fixed to surfaces at both sides of a pipe 12a in a heat exchanger 8 illustrated in FIG. 8, respectively.

Figure 9:
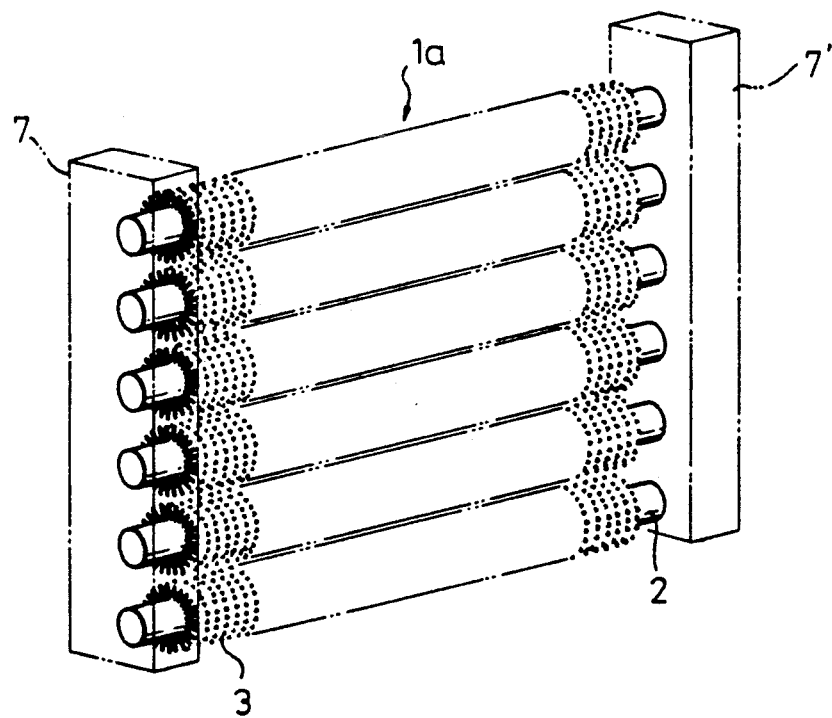
FIG. 9 is a perspective view of another embodiment of the pin-fin type heat exchanger having a constitution similar to that of the heat exchanger illustrated in FIG. 3, but equipped with a pair of headers.

As shown in FIG. 6(A) to FIG. 8, the flat pipe 12a is used for the piling type heat exchanger, but as shown in FIG. 9, it is possible to provide a piling type heat exchanger 1a using a cylindrical pipe 2 and headers 7 and 7'.

As a wire-like heat conductive element used in a heat exchanger in accordance with the present invention, a fine wire of a pure metal such as silver, copper, aluminum or the like, a fine wire of an alloy or a fine metal wire obtained by plating a solder or a tin onto the above-mentioned fine wire, can be used.

A wire-like heat conductive element having an optional sectional shape can be used, but it is preferable to use a wire-like heat conductive element having a sectional shape close to a circle, to reduce pressure loss when the wire-like heat conductive element is used as a pin-fin member of the heat-exchanger.

Preferably, a heat conductive ratio of a wire-like heat conductive element is 0.038 cal/cm·sec.° C. or more, and a wire-like heat conductive element having a suitable heat conductive ratio may be selected according to the application of the heat exchanger.

Various surface treatments, such as a hydrophilic treatment, a rust-proofing treatment, a ceramic coating or the like may be optionally applied to the wire-like heat conductive element at any stage during the manufacture of the heat exchanger.

As can be seen from the above description, the features of the heat exchanger in accordance with the present invention are that a fin is formed of a plurality of wire-like heat conductive elements arranged in parallel and spaced from each other, and having a corrugated shape, and curved tops of at least one side of the corrugated heat conductive elements are fixed to the pipe of the heat exchanger.

The following description is of a heat transfer mechanism of the heat exchanger in accordance with the present invention and of a conventional heat exchanger.

Figure 10A:
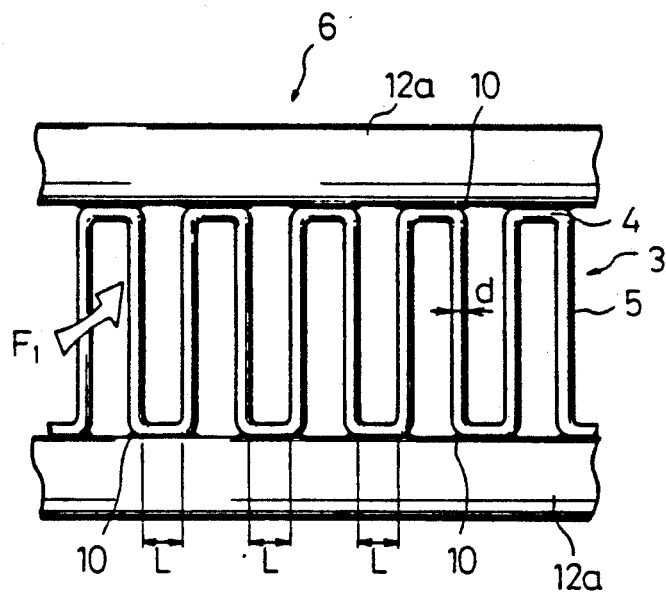
FIG. 10(A) is an enlarged front view illustrating a heat transfer mechanism between a pipe-side fluid and an outside fluid in the pin-fin type heat exchanger in accordance with the present invention.
Figure 10B:
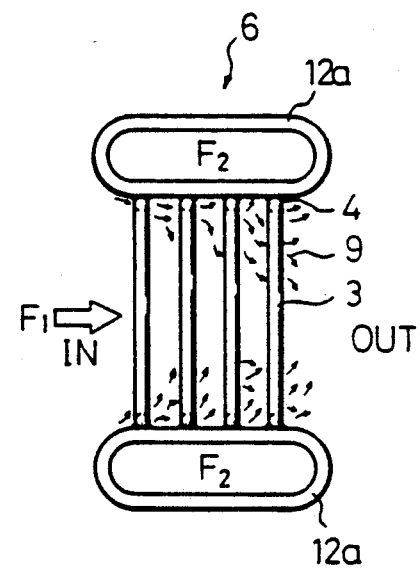
FIG. 10(B) is an enlarged sectional view corresponding to FIG. 10(A)
Figure 11A:
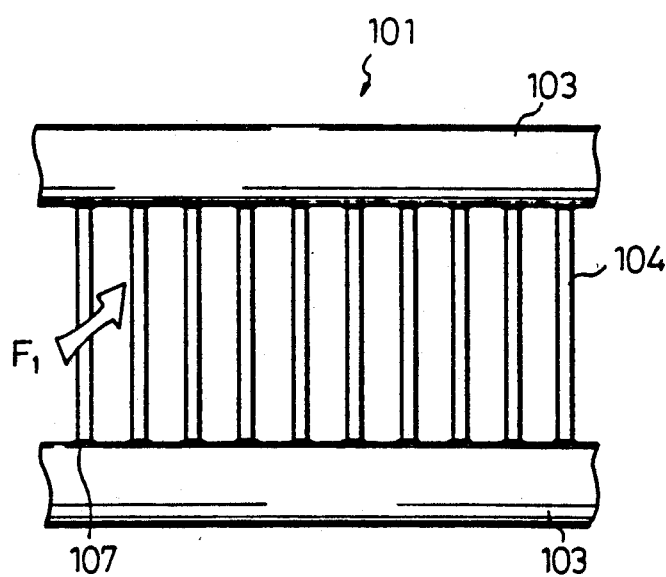
FIG. 11(A) is an enlarged front view illustrating a heat transfer mechanism between a pipe-side fluid and an outside fluid in a conventional pin-fin type heat exchanger.
Figure 11B:
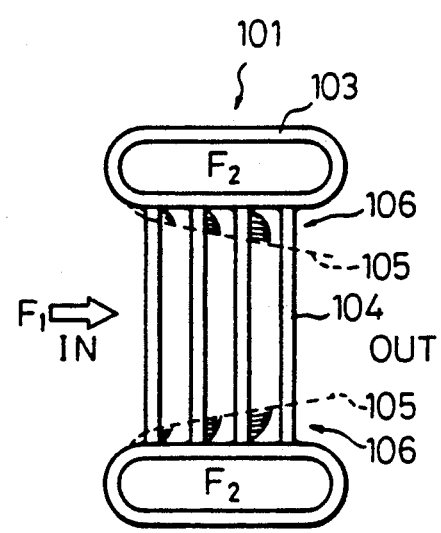
FIG. 11(B) is an enlarged sectional view corresponding to FIG. 11(A)

FIG. 10(A) is an enlarged front view of a part of the heat exchanger having the corrugated heat conductive elements in accordance with the present invention, and FIG. 10(B) is an enlarged sectional view of the part illustrated in FIG. 10(A). FIG. 11(A) is an enlarged front view of a part of the conventional pin-fin type heat exchanger, and FIG. 11(B) is an enlarged sectional view of the part illustrated in FIG. 11(B). In the drawings, $F_1$ denotes an outside fluid and $F_2$ a pipe-side fluid.

The outside fluid $F_1$ enters the heat exchanger 6 or 101 from a side marked "IN" and is exhausted from the heat exchanger 6 or 101 at a side marked "OUT", and at this time, heat from the outside fluid $F_1$ is transferred through the heat conductive elements 3 or pins 104 and the pipe 12a or 103 to the pipe-side fluid $F_2$.

In the conventional heat exchanger 101, since there is no member of part in the pipe 103 obstructing a fluid flow passing from "IN" to "OUT", a boundary layer 106 of the outside fluid $F_1$ is generated in an area defined between surfaces of the pipe 103 and a chain line 105 as shown in FIG. 11(B).

In the heat exchanger 6 in accordance with the present invention, since the curved tops 4 having a length of L are arranged along the surface of the pipe 12a as shown in FIG. 10(A), a fluid flow passing from "IN" to "OUT" is obstructed by the curved tops 4 at a position near to the surface of the pipe 12a, so that a turbulent flow 9 is generated, compared with that of the conventional heat exchanger, as shown in FIG. 10(B). Therefore, a thickness of a boundary layer on the surface of the pipe 12a is thinner than in the case of the conventional heat exchanger, or the boundary layer is removed from the surface of the pipe 12a. As a result, the heat transfer efficiency per unit surface area of the heat conductive material in the heat exchanger in accordance with the present invention is greater than that of the conventional heat exchanger.

Further, since it is difficult for the boundary layer to be generated or be maintained on the surface of the pipe 12a in the heat exchanger in accordance with the present invention, the heat transfer efficiency on the surface of the pipe, which does not contribute to the heat transfer operation in the conventional heat exchanger, is improved. This ensure a higher heat transfer efficiency of the heat exchanger in accordance with the present invention.

To increase the heat transfer efficiency such that a pressure loss of the outside fluid is minimized, preferably a diameter d (mm) of the wire-like heat conductive element and a contacting length L (mm) between the curved top of the wire-like heat conductive element and the pipe satisfies the following equation.

$$1 < L/d \leq 9$$

When L/d is equal to 1.0 or less than 1.0, although a total heat transfer efficiency of the heat exchanger is increased, the pressure loss of the outside fluid in the heat exchanger is increased, and therefore, a blowing force of a fan used in the heat exchanger must be increased.

When L/d is more than 9.0, although the pressure loss of the outside fluid is reduced, a turbulent effect caused by the curved tops of the wire-like heat conductive elements fixed to a surface of the pipe is also reduced. Further, a total surface area of the wire-like heat conductive elements per unit volume of the heat exchanger is reduced, and as a result, the total heat transfer efficiency of the heat exchanger is lowered.

Preferably, the size of the wire-like heat conductive element and the density of the plurality of wire-like heat conductive element satisfies the following equation.

$$0.25 \leq X \leq 2.5$$

$$0.5 \leq XY \leq 2.5$$

Wherein, X stands for a circumstantial length of the wire-like heat conductive element and is expressed as mm, and Y stands for a density of the wire-like heat conductive elements on the pipe and is expressed as a number per mm.

Figure 12:
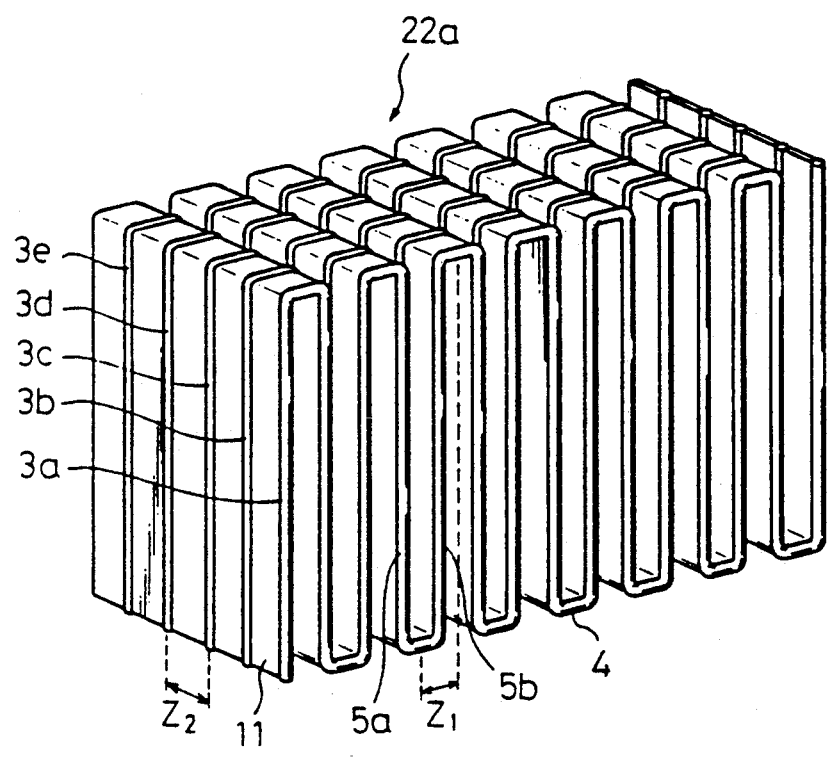
FIG. 12 is a perspective view illustrating a part of an example of a corrugated sheet used to make the pin-fin type heat exchanger in accordance with the present invention.

An example of a corrugated sheet used to form the pin-fin type heat exchanger in accordance with the present invention, described in detail later, is illustrated in FIG. 12. As shown in FIG. 12, five wire-like heat conductive elements $3a$, $3b$, $3c$, $3d$ and $3e$ are arranged in a corrugated shape in the sheet $22a$. The five heat conductive materials $3a$, $3b$, $3c$, $3d$ and $3e$ are embedded while spaced from each other into a temporary fixing material, e.g., a plastic sheet 11. In the present application, a distance between two adjacent heat conductive elements is defined as $Z_2$, as shown in FIG. 12. Each heat conductive element is bent into a corrugated shape and a distance between a center point of a curved top 4 of a heat conductive element and a center point of an adjacent curved top 4 of the same element, i.e., a distance between two adjacent parallel portions $5a$ and $5b$ of the heat conductive elements $3a$, is defined as $Z_1$, as shown in FIG. 12.

The density $Y_1$ of the heat conductive elements expressed as a number of elements per mm in a lengthwise direction of the heat conductive elements is calculated from the value $Z_1$ and the density $Y_2$ of the heat conductive elements expressed as a number of elements per mm in a direction perpendicular to the lengthwise direction of the heat conductive element is calculated from the value $Z_2$. The symbol Y used in the above equation is defined as a mean value of $Y_1$ and $Y_2$.

Preferably, $Y_1$ and $Y_2$ represent 0.2 per mm to 10 per mm, respectively, under conditions satisfying the above equations.

When X is less than 0.25, the diameter of the wire-like heat conductive element is too small, and the mechanical properties of the heat conductive elements are correspondingly reduced, and thus the processing efficiency at the time of manufacture of the heat exchanger is lowered. Namely, the production efficiency of the heat exchanger is lowered.

When X is more than 2.5, the diameter of the wire-like heat conductive element is too large, which reduces the number of heat conductive elements that can be arranged on an unit length of the pipe, and thus a problem arises in that the efficiency of the pin-type heat exchanger is lowered.

When XY is less than 0.5, the total surface area of the wire-like heat conductive elements is too small, and thus it is impossible to obtain a high heat transfer efficiency.

When XY is more than 2.5, although a wire-like heat conductive element having a large surface area can be used, since the distances between the heat conductive elements arranged in parallel, i.e, the distances $Z_1$ and $Z_2$ in FIG. 12, become too small, the pressure loss of the outside fluid is increased.

More particularly, in the heat exchanger illustrated in FIGS. 3, 4 and 9, in which a plurality of wire-like heat conductive elements are arranged around the entire circumferential surface of the pipe, preferably the following equations are satisfied:

$$0.25 \leq X \leq 0.95$$

$$0.5 \leq XY \leq 2.5$$

Further, in the heat exchanger illustration FIGS. 5 to 8, in which a plurality of the wire-like heat conductive elements are arranged or an upper face and/or a lower face of the pipe, preferably the following equations are satisfied:

$$0.3 \leq X \leq 2.5$$

$$0.5 \leq XY \leq 1.6$$

The method of manufacturing the heat exchanger in accordance with the present invention is now described in detail.

Figure 13:
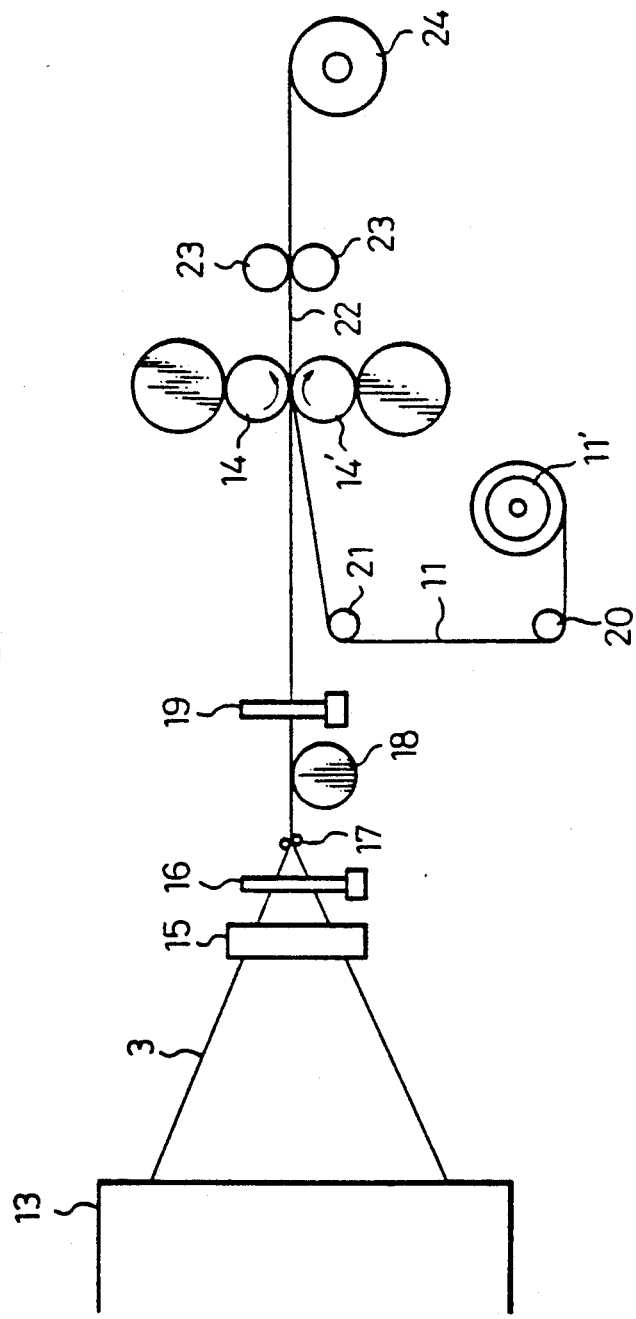
FIG. 13 is a front view schematically illustrating an apparatus for manufacturing a sheet composed of a plurality of wire-like heat conductive elements and a temporary fixing material.

An example of an apparatus for manufacturing a sheet composed of a plurality of wire-like heat conductive elements and a temporary fixing material is illustrated in FIG. 13.

A plurality of packages of wire-like heat conductive elements 3 are arranged in a creel 13. Each heat conductive element 3 is withdrawn from the packages by a pair of heated press rolls 14 and 14', the heat conductive element 3 is passed through an eyelet plate 15, a front reed 16, and a tensioning bar 17 to apply an uniform tension to each heat conductive elements 3, and then the heat conductive elements 3 are arranged in a state in which substantially the same pitch is fixed between adjacent heat conductive elements by a guide roller 18 having a plurality of grooves and an arranging reed 19.

A sheet 11 of a soluble resin is withdrawn from a sheet roll 11', and supplied through two guide rolls 20 and 21 to the pair of heated press rolls 14 and 14'. The sheet 11 and the plurality of the heat conductive elements 3 are piled together and pressed under heating by the pair of heated press rolls 14 and 14', and then united by embedding the heat conductive elements 3 in the sheet 11.

The united sheet 22 composed of the soluble resin sheet 11 and the heat conductive elements 3, i.e., an anisotropic heat conductive sheet, can be obtained by applying two soluble resin sheets to the heat conductive elements 3 from both sides thereof and then pressing under heating. Further, a part of the cross section of each heat conductive element 3 may be embedded in the soluble resin sheet 11.

The united sheet 22 is wound, through a pair of delivery rollers 23 and 23', onto a winding roll 24.

Various sheets of a substance capable of being dissolved, decomposed or burnt by a heat, chemicals or the like can be used. For example, a sheet of a cellulose group, a polyester group, or a cellulose derivative, a sheet of the cellulose derivative, and a cellulose pulp or the like, can be used. A sheet manufactured by coating or laminating a polyvinyl alcohol on a sheet formed from a mixture of a carboxymethyl cellulose and the cellulose pulp also can be used. Further, it is possible to optionally combine the above-mentioned sheets. Note, a sheet made of the cellulose pulp is most preferable, due to the easy processing thereof.

A width and a thickness of the soluble sheet can be optionally selected, but a sheet having a width of between 0.5 m and 1.5 m and a thickness of between 10 $\mu$m and 200 $\mu$m is preferable, due to the easy processing thereof.

Although the wire-like heat conductive elements 3 are embedded in the soluble sheet 11 under the heat and pressing conditions described on the basis of FIG. 13, these elements 3 also can be fixed by coating an adhesive capable of being dissolved, decomposed or burnt by heat, chemicals or the like on the soluble sheet. Various adhesives, for example, a polyvinyl alcohol group, a polyester group, an ethylene-vinyl acetate group, a protein group, a cellulose derivative group or the like can be used.

Figure 14:
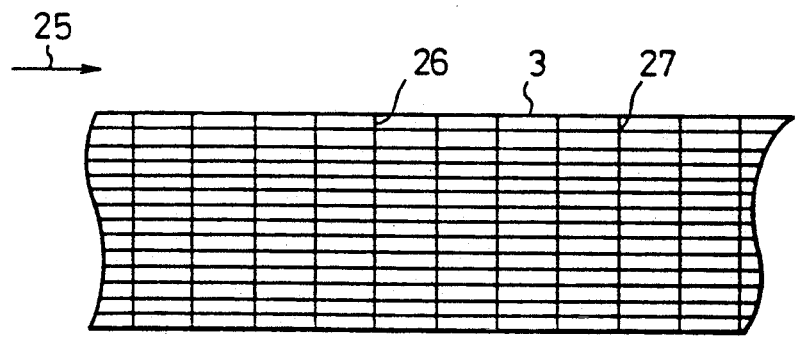
FIG. 14 is a plan view illustrating a sheet in which a plurality of wire-like heat conductive elements are fixed by another plurality of wire-like heat conductive elements arranged in a direction perpendicular to the former elements.

Further, the fixing of the plurality of wire-like heat conductive elements 3 arranged in parallel and spaced from each other can be carried out without using the soluble sheet, as shown in FIG. 14. Namely, first the plurality of the wire-like heat conductive elements 3 is withdrawn in a direction of an arrow 25, and other wire-like heat conductive elements 26 manufactured from the same substance as that of the heat conductive elements 3 are piled in a direction perpendicular to the direction of the arrow 25 on the plurality of the wire-like heat conductive element 3, and then fixed spot welding at each cross point 27 of the two heat conductive elements 3 and 26.

Further, a yarn having a thermoplastic property or a thermoadhesive property can be used in place of the heat conductive material 26 in FIG. 14.

Figure 15:
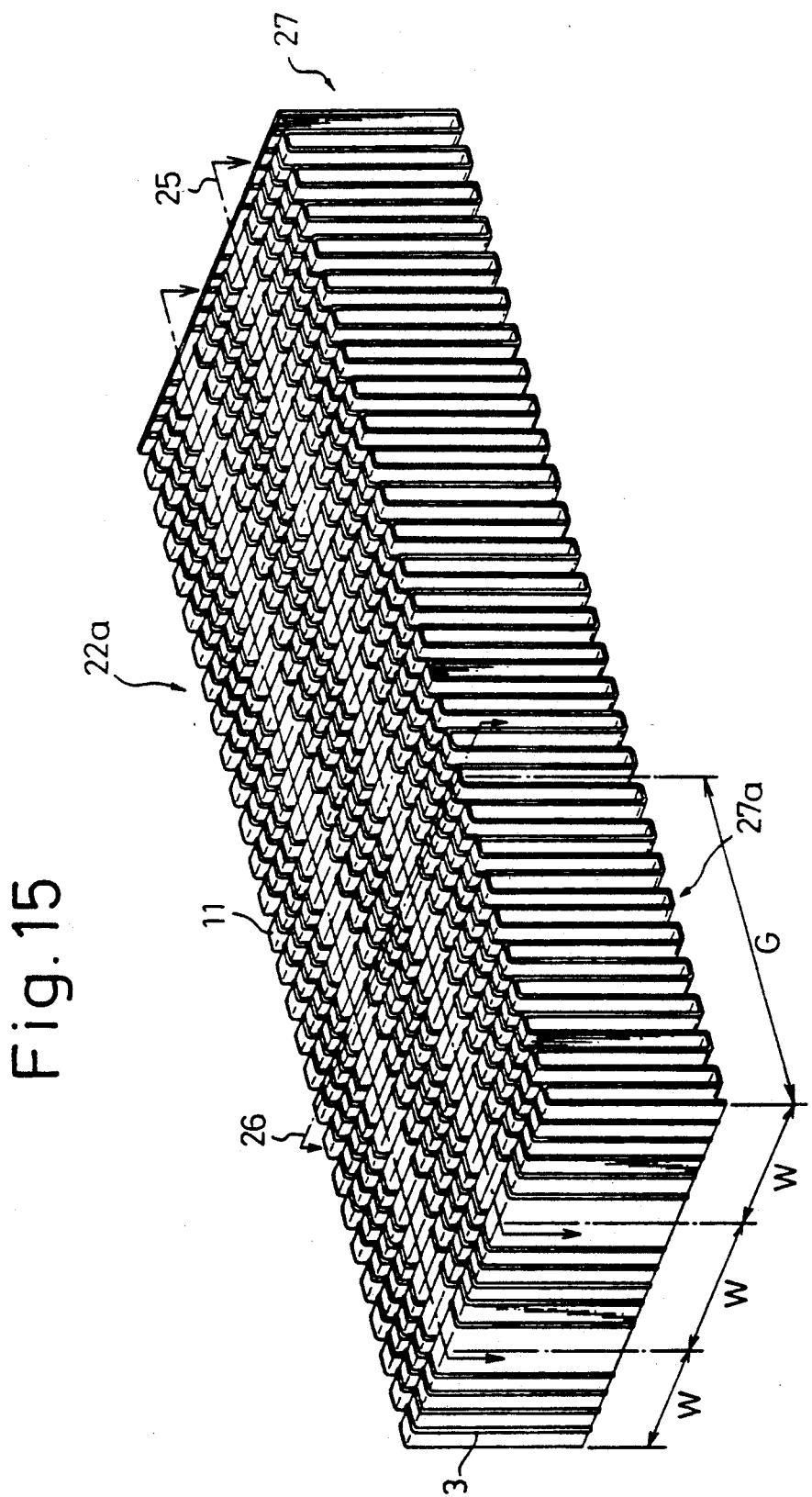
FIG. 15 is a perspective view illustrating an example of the corrugated sheet used to make the pin-fin type heat-exchanger in accordance with the present invention.

Next, the plurality of the wire-like heat conductive elements fixed in parallel and spaced from each other are molded into a corrugated shape by a corrugate molding machine generally used to mold a corrugated fin of a conventional corrugated plate-fin type heat exchanger, or by a pleat molding machine commercially supplied for making a pleated textile goods. For example, when using the corrugate molding machine, the plurality of the wire-like heat conductive elements fixed in parallel and spaced from each other are compression molded in a corrugated shape by a pair of corrugate press plates, and when a diameter of the wire-like heat conductive element is thin, e.g., 200 $\mu$m, an accordion type pleat molding machine may be used. The obtained wire-like heat conductive elements 22a having the corrugated shape (hereinafter, referred to as a corrugated and united body) are illustrated in FIG. 15. Although the densities $Y_1$ and $Y_2$ are the same in all portions of the corrugated and united body 22a illustrated in FIG. 15, if necessary, the density $Y_1$ and $Y_2$ may be partially changed in the corrugated and united body 22a according to the application of the heat exchanger.

The heat exchanger 1 illustrated in, e.g., FIG. 3, or the heat exchanger 6 illustrated in, e.g., FIG. 5, are manufactured from the corrugated and united body 22a.

Figure 16:
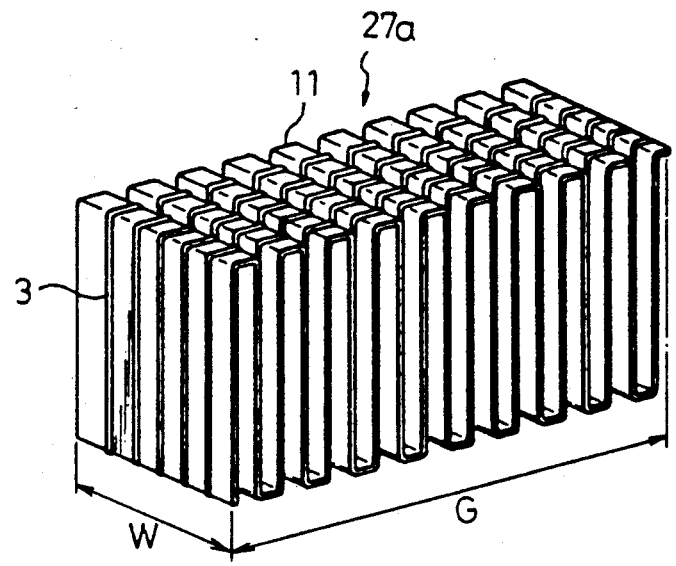
FIG. 16 is a perspective view illustrating an example of a piece cut from the corrugated sheet illustrating in FIG. 15.
Figure 19:
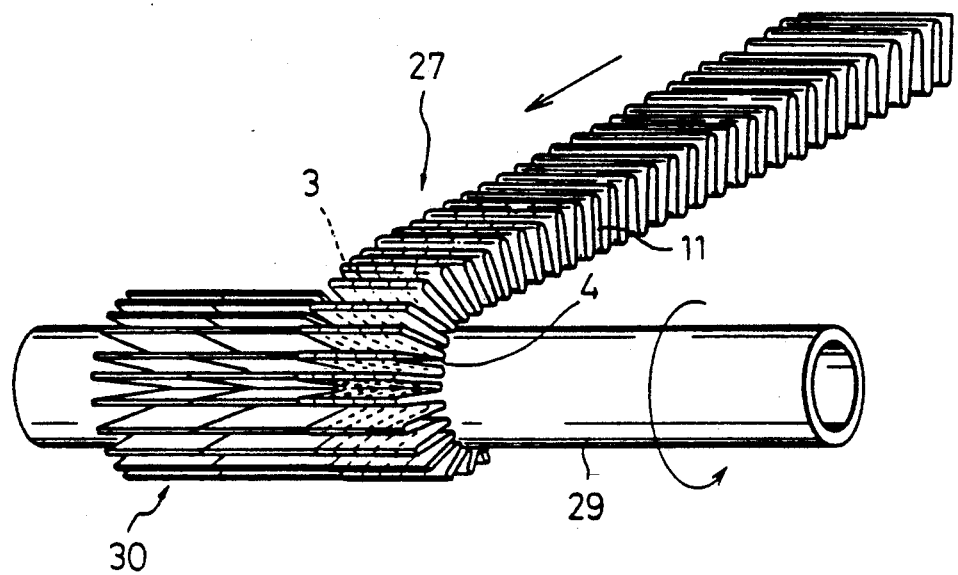
FIG. 19 is a perspective view illustrating a winding of the corrugated sheet on the surface of the pipe.

When manufacturing the heat exchanger 1 illustrated in FIG. 3, the corrugated and united body 22a is cut along a lengthwise direction thereof, i.e., along the line 25 in FIG. 15, to produce a tape-like corrugated and united body 27 having a width W as shown in FIG. 15. The heat exchanger 1 can be obtained by spirally winding the tape-like corrugated and united body 27 around a circumferential surface of the pipe 2 as shown in FIG. 19. If necessary, the tape-like corrugated and united body 27 is further cut along a direction perpendicular to the lengthwise direction of the corrugated and united body 22a, i.e., along the line 26 in FIG. 15, to provide a corrugated and united body unit 27a having a width W and a length G as shown in FIG. 15. In this case the length G is determined such that the length G of the pipe 2. The corrugated and united body unit 27a is illustrated in FIG. 16. The heat exchanger 1 can be obtained by joining each corrugated and united body unit 27a to the circumferential surface of the pipe 2.

Figure 17:
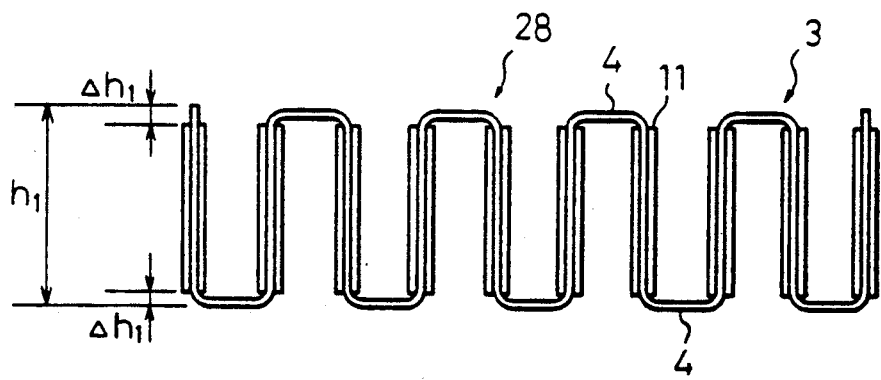
FIG. 17 is a front view illustrating a piece of the corrugated sheet from which the temporary fixing material on a curved top of the sheet has been removed.

Before joining the corrugated and united body to the surface of the pipe, it is necessary to remove the temporary fixing material, e.g., a soluble resin covering curved tops of the wire-like heat conductive elements, to expose the surface of heat conductive element. FIG. 17 illustrates an example of a corrugated and united body 28 to be used for the heat exchanger 6 illustrated in FIG. 5, from which the soluble resin 11 covering both curved tops 4 of the wire-like heat conductive material 3 has been removed by $\Delta h_1$. The value of $\Delta h_1$ may be between 0 and 1 mm. This resin removing treatment may be applied to the corrugated and united body before or after cutting same.

The process of joining the corrugated and united body to the pipe will now be described.

Figure 18:
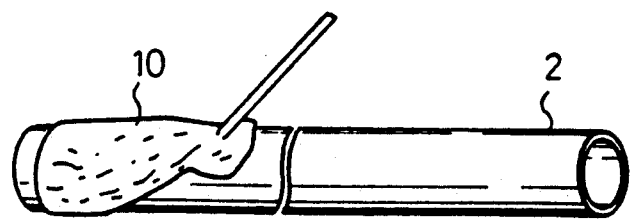
FIG. 18 is a perspective view explaining an application of a solder on a surface of a pipe.

First, the joining process in a manufactured of the heat exchanger 1 illustrated in FIG. 3 will be described. As shown in FIG. 18, a circumferential surface of a pipe 2 is applied with a solder 10 to produce a soldering pipe 29. The solder applying treatment may be performed by any known method, e.g., a coating method, a dipping method or a vapor deposition method. The solder is optionally selected according to a material constituting the pipe and a material of the wire-like heat conductive element. For example, when the pipe and the wire-like heat conductive element are manufactured from copper, a solder composed mainly of lead and tin may be used. If necessary, a resin having a high heat conductivity may be used. The coating of solder may be applied to the curved tops 4 exposed from the resin 11 or to both portions, i.e., the pipe 2 and the curved tops 4.

Figure 20:
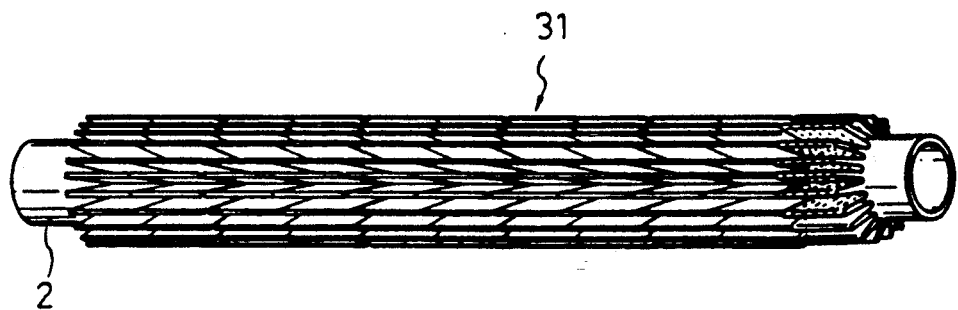
FIG. 20 is a perspective view illustrating an example of a fin-pipe assembly.

As shown in FIG. 19, the tape-like corrugated and united body 27, the curved tops of which at a side opposite to the circumferential surface of the pipe 29 are exposed, is spirally wound on the pipe 29. The thus obtained wound body 30 is placed for e.g., 30 min, into an oven (not shown) at a temperature of e.g., 165° C., to firmly braze together the circumferential surface of the pipe 29 and the curved tops 4 of the corrugated and united body, to thereby produce a pipe fin assembly 31 as shown in FIG. 20.

Figure 21:
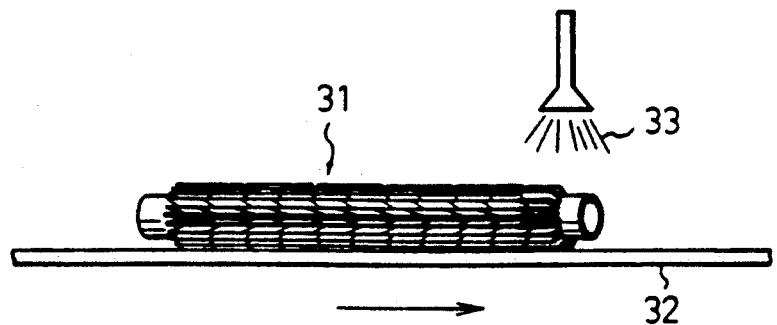
FIG. 21 is a perspective view explaining a procedure of removing the temporary fixing material from the fin-pipe assembly.
Figures 22A, 22B:
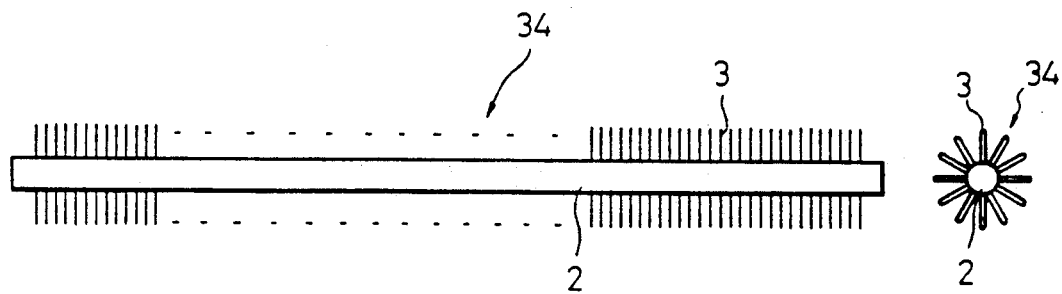
FIG. 22(A) is a longitudinal sectional view of the fin-pipe assembly from which the temporary fixing material has been completely removed.
FIG. 22(B) is a traverse sectional view of the pipe-fin assembly corresponding to FIG. 22(A)

Since the temporary fixing material, i.e., the soluble resin 11, still remains in spaces between the wire-like heat conductive elements 3 in the fin-pipe assembly 31, the soluble rein 11 is removed by using the apparatus illustrated, for example, in FIG. 21. Namely, the fin-pipe assembly 31 is placed on a moving belt 32 and hot water 33 at a temperature of about 100° C. is poured over the fin-pipe assembly 31 to completely remove the soluble resin 11 from the spaces. As shown in FIG. 22(A) and 22(B), when the resin is completely removed from the spaces, an exposed fin-pipe assembly 34 is obtained.

The solder may be removed by dipping the fin-pipe assembly 31 into a vessel holding hot water.

It is preferable to apply a surface treatment to the exposed fin-pipe assembly 34 to provide a hydrophilicity to the exposed fin-pipe assembly 34 or to increase a corrosion resistance of the exposed fin-pipe assembly 34. For example, when aluminum is used as a material of the pipe 2 and the wire-like heat conductive elements 3, a film having a good corrosion resistance may be formed on the surface of the exposed fin-pipe assembly 34 by treating same with a chemical, e.g., a chromate, a phosphate or the like, and then covering the film with another film of an organic substance or an inorganic substance by applying an inorganic substance, such as fine particles of a silicate, a silica or the like, or an organic substances, such as a polyvinyl alcohol, an acrylic group resin or the like, to provide a hydrophilicity.

Figure 23:
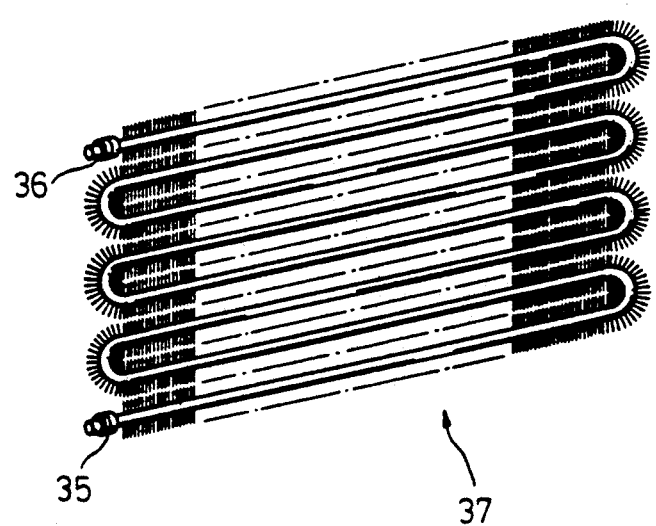
FIG. 23 is a perspective view illustrating an embodiment of the pin-fin type heat exchanger made of the pipe-fin assembly illustrated in FIG. 22(A)

An embodiment of the heat exchanger 37 manufactured by bending the exposed fin-pipe assembly 34 into a S-like shape, and connecting an inlet 35 of a pipe-side fluid and an outlet 36 of the pipe-side fluid to the ends of the pipe 2 of the exposed fin-pipe assembly 34 is illustrated in FIG. 23.

The joining process in a manufacture of the heat exchanger 5 illustrated in FIG. 5 will be described hereafter.

Figure 24A:
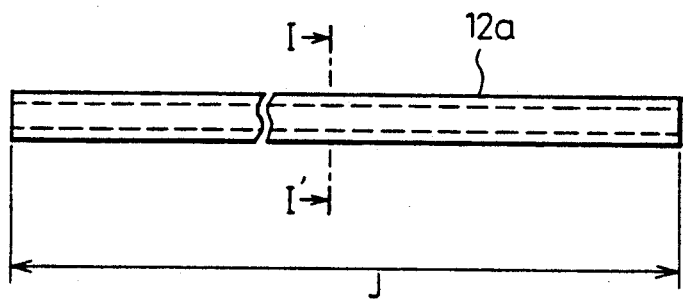
FIG. 24(A) is a front view illustrating a flat pipe used in another embodiment of the pin-fin type heat exchanger in accordance with the present invention.
Figure 24B:
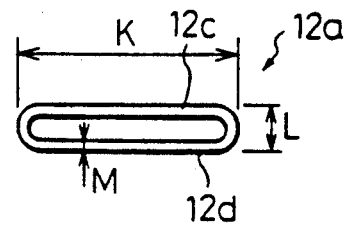
FIG. 24(B) is a sectional view taken along the line I and I'.

First, a flat pipe 12 having a size and a shape illustrated in FIG. 24(A) and 24(B) is prepared. In the drawings, J denotes a length of the pipe 12a, K a width of the pipe, L a thickness of the pipe, and M a thickness of metal plate constituting the pipe 12a.

Although the flat pipe 12a in which opposite portions 12c and 12d in a sectional view are parallel is illustrated in FIG. 24(B), a pipe having an elliptic cross section may be used in place of the flat pipe 12a for the heat exchanger 5 illustrated in FIG. 5.

Figure 25:
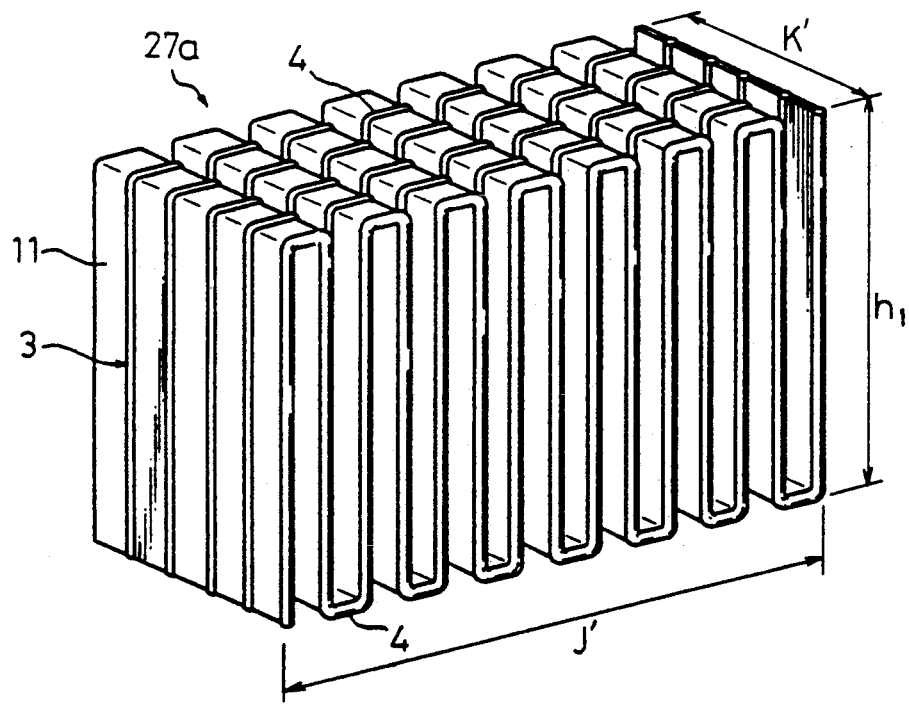
FIG. 25 is a perspective view illustrating an example of a piece of the corrugated sheet used to make another embodiment of the pin-fin type heat exchanger in accordance with the present invention.
Figure 26:
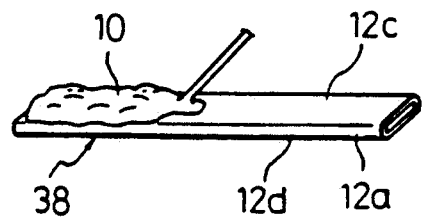
FIG. 26 is a perspective view explaining an application of a solder on a surface of a flat pipe.

As shown in FIG. 25, a corrugated and united body unit 27a is prepared by cutting the corrugated and united body 22a illustrated in FIG. 15. In this case, a length J' and a width K' of the corrugated and united body unit 27a may be shorter than that of the corresponding portions of the pipe 12 illustrated in FIGS. 24(A) and 24(B). The curved tops 4 at both sides of the corrugated and united body 27a are removed.

Flat portions 12c and 12d of the flat pipe 12a are applied with a solder 10 to provide a soldering pipe 38. The solder may be applied in the same manner as described for FIG. 18.

Figure 27:
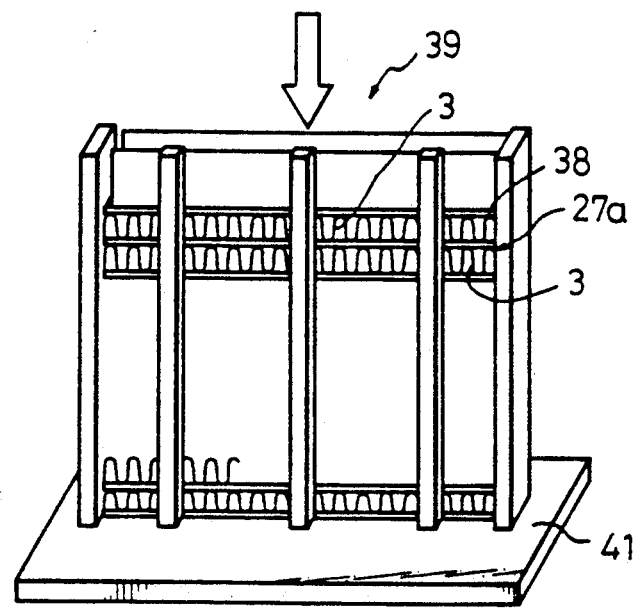
FIG. 27 is a perspective view illustrating a method of making a plurality of pipe-fin assemblies to a piling body.

FIG. 27 illustrates a method of assembling the corrugated and united body units 27a and the soldering pipes 38 to obtain a piling body 39 constituting a heat exchanger having headers 7 and 7' (see FIG. 6(A) and 6(B)) or a U-shape pipe 12b (see FIG. 5). As shown in FIG. 27, several corrugated and united body units 27a and several soldering pipes 38 are alternately piled by an implement 41 and are fixed to each other under a pressure of, for example, about 2 kg per cm², to produce a piling body 39. The piling body 39 is placed for, e.g., 30 min, in an oven at a temperature of, e.g., 165° C., (not shown) to firmly braze together the surface of the soldering pipe 38 and the curved tops 4 of the corrugated and unit body unit 27a, to thereby produce a fin-pipe assembly.

Figure 29:
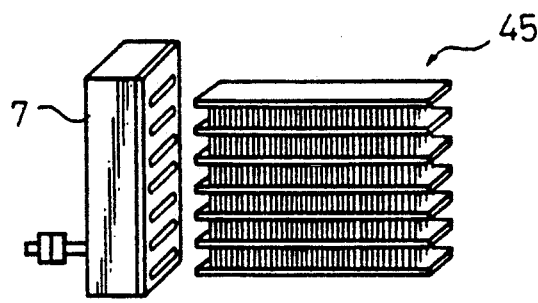
FIG. 29 is a perspective view illustrating a relationship between the piling body illustrated in FIG. 27 and a header.

A soluble resin 11 remaining in spaces between the wire-like heat conductive elements 3 in the fin-pipe assembly is removed in the same manner as described for FIG. 21. The thus obtained an exposed fin-pipe assemble 45 is connected to a header 7, as shown in FIG. 29, and the header is connected to both sides of the exposed fin-pipe assembly 45, and the headers and the exposed fin-pipe assemble 45 are brazed together by a solder. The header 7 includes several connecting pipes connecting adjacent flat pipes 12, an inlet of a pipe-side fluid, and an outlet of the pipe-side fluid.

It is preferable to apply a surface treatment to the exposed fin-pipe assembly 45 to provide hydrophilicity thereto and to improve the corrosion resistance, in the same manner as described for the manufacture of the heat exchanger 1.

The pressure used to obtain the piling body 39 depends on manufacturing conditions for the corrugated and united body unit 27a, e.g., the diameter of the wire-like heat conductive elements, the pitch of the heat conductive elements, the thickness and the material of the soluble resin sheet, or the like. Of course, the pressure must not be such that the corrugated and united body unit 27a is buckled by the pressure and temperature in the oven and the joining between the pipes and the curve tops of the wire-like heat conductive material is weak.

Figure 28:
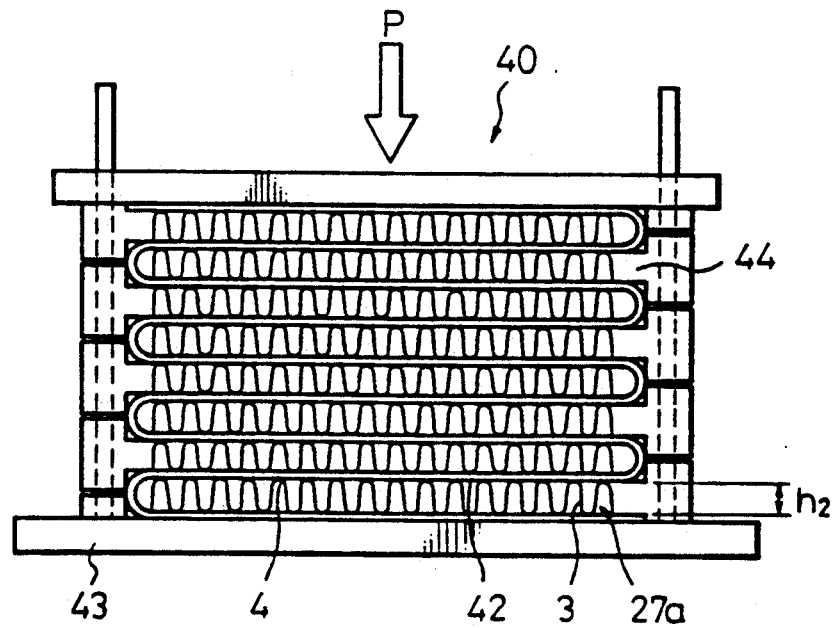
FIG. 28 is a perspective view illustrating another method of making a plurality of pipe-fin assemblies to another piling body.

FIG. 28 illustrates a method of assembling the corrugated and united body units 27a and a soldering pipe having an S-like shape to obtain a piling body 40. When preparing the soldering pipe 42, preferably a distance $h_2$ between adjacent parallel portions of the soldering pipe 42 is smaller than the height $h_1$ of the corrugated and united body units 27a. The corrugated between the adjacent parallel portions of the soldering pipe 42 having the S-like shape, and the units 27a and the pipe 42 are arranged in an implement 43. In that time, spacers 44 are inserted between the adjacent parallel portion of the soldering pipe 42 so that the distance $h_2$ becomes the distance $h_1$ after applying a pressure to the units 27a and the pipe 42. The piling body 40 is obtained by carrying out a heat treatment on the implement 43 with the units 27a and the pipe 42, similar to that described for FIG. 27.

A heat exchanger using the flat pipe having the S-like shape can be obtained by connecting an inlet of a pipe-side fluid and an outlet of the pipe-side fluid to ends of the flat pipe.

Since a fin of the heat exchanger in accordance with the present invention is formed by corrugating the wire-like heat conductive elements, a heat exchanger having a desired excellent heat transfer efficiency can be obtained by suitably determining the diameter of the wire-like heat conductive elements and the density thereof. Also, since the wire-like heat conductive element is used and the corrugating operation is used to make the corrugated and united body, it is possible to manufacture a fin having a precisely arranged density of the wire-like heat conductive elements. Further, since the fin includes the plurality of curved tops, a heat exchanger having the excellent heat transfer efficiency and less pressure loss can be obtained.

Since in the method of manufacturing the heat exchanger in accordance with the present invention the corrugated and united body is joined to the pipe instead of fixing each pin on a surface of a pipe as a conventional heat exchanger, it is possible to easily manufacture the heat exchanger having an excellent heat transfer efficiency.

EXAMPLES

The present invention will be explained further by means of examples which in no way limit the invention.

An united sheet is manufactured from a plurality of wire-like heat conductive elements and a sheet of soluble resin by an apparatus illustrated in FIG. 13, a corrugated and united body is manufactured by corrugating the united sheet, and curved tops of the wire-like heat conductive elements in the corrugated and united body are exposed by removing the soluble resin on the curved tops.

The manufacturing conditions when making the corrugated and united body are as follows Wire-like heat conductive element
Shape in Cross Section: Circular
Diameter: 200 $\mu m \phi$
Material: Copper
Number of bobbins of wire-like element: 500
Feeding of Wire-like element: Withdrawing in direction perpendicular to bobbin axis while rotating bobbin
Running speed of wire-like element: 1 m/min
Reed: 25.4 pieces per 1 inch, i.e., pitch of reed: 1 mm
Soluble resin sheet: Polyvinyl alcohol film supplied from Soko seiren Co., Ltd, thickness: 200 $\mu m$ Heated press roller
  Temperature: 200° C.
  Press: 20 kg/cm
  Corrugating machine: Accordion pleat machine supplied from Toyo Kokisha
  Height of corrugation: 8 mm

EXAMPLE 1

To manufacture a heat exchanger having a structure similar to that illustrated in FIG. 3, a circular pipe having a diameter of 7.94 mm and produced from a copper plate having a thickness of 0.30 mm was prepared. A tape-like corrugated and united body was wound around the circular pipe as shown in FIG. 19 and placed in an oven to braze the tape-like corrugated and united body to the circular pipe to produce a fin-pipe assembly. The soluble resin in the fin-pipe assembly was removed, and an inlet and an outlet of a pipe-side fluid are provided at both ends of the circular pipe, whereby a heat exchanger similar to the heat exchanger illustrated in FIG. 3 was obtained. A value of L/d of this heat exchanger was 4, X was 0.628 and Y was 1 per mm.

EXAMPLE 2

To manufacture a heat exchanger having a structure similar to that illustrated in FIG. 5, several corrugated and united body units were arranged in spaces between adjacent flat pipes having a minor axis of 5 mm and a major axis of 12.7 mm in cross section and made of a copper plate having a thickness of 0.65 mm, respectively, by a jig illustrated in FIG. 27, and placed in an oven to braze the corrugated and united body units to the flat pipes to produce a fin-pipe assembly. The soluble resin in the fin-pipe assembly was removed, and a header including an inlet and an outlet of a pipe-side fluid was provided at both ends of the flat pipes, respectively. Thus a heat exchanger similar to the heat exchanger illustrated FIG. 5 was obtained. Note that the values of L/d, X and Y of this heat exchanger were the same as that of the heat exchanger of Example 1.

To manufacture comparative examples of a heat exchanger, a united sheet was manufactured by the same method as used for manufacturing the united sheet for the above-mentioned examples of the heat exchanger in accordance with the present invention, except that two soluble resin sheets having a thickness of 500 μm were used.

Figure 30:
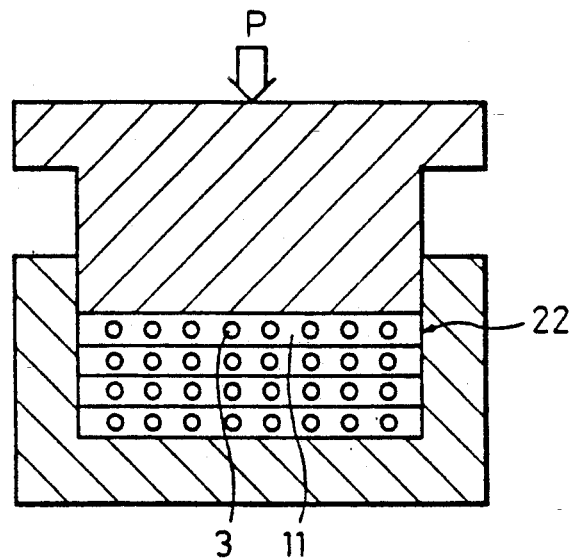
FIG. 30 is a front view illustrating an apparatus for manufacturing a conventional anisotropic heat conductive structure.
Figure 31:
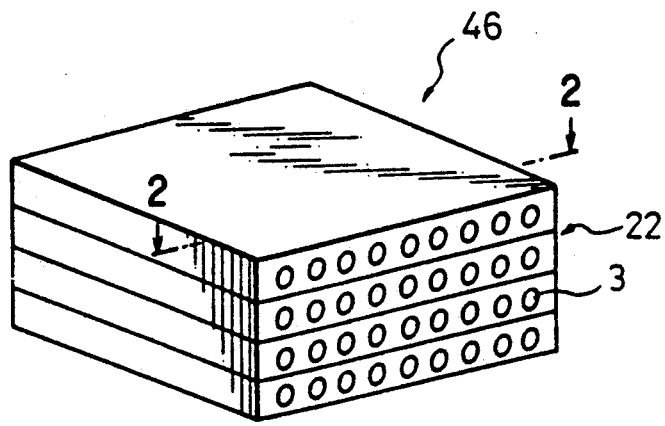
FIG. 31 is a perspective view illustrating the conventional anisotropic heat conductive structure made by using the apparatus illustrated in FIG. 30.

Eleven united sheets 22 were piled and pressed by an apparatus illustrated in FIG. 30 to produce an anisotropic heat conductive structure 46 (see FIG. 31). The sheets were pressed for 30 min at a temperature of 175° C. This structure 46 was cut along a line II to II to form an anisotropic heat conductive sheet 47 having a thickness of 8 mm as shown in FIG. 31.

Figure 32:
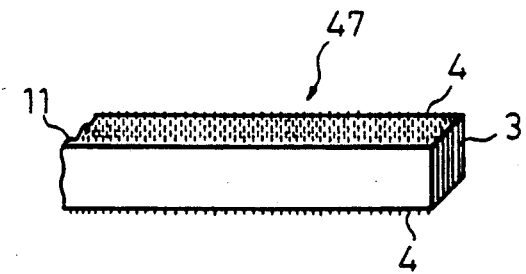
FIG. 32 is a perspective view illustrating a conventional anisotropic heat conductive block obtained from the structure illustrated in FIG. 31.

A soluble resin of both sides of the anisotropic heat conductive block 47 was removed to expose both ends of a heat conductive material included in the anisotropic heat conductive block 47 (see FIG. 32).

COMPARATIVE EXAMPLE 1

Figure 33:
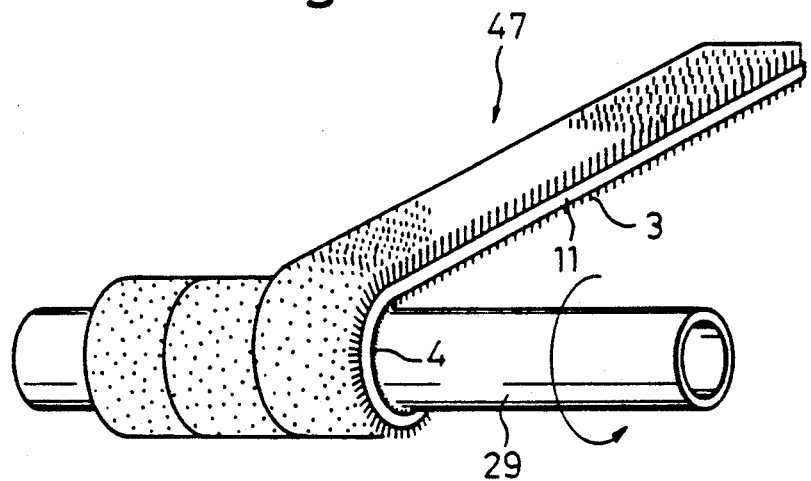
FIG. 33 is a perspective view illustrating a winding of the conventional anisotropic heat conductive block illustrating in FIG. 32 onto a surface of a pipe.

A heat exchanger having the same structure as that of Example 1 was manufactured by the same method as that used to manufacture the example shown in FIG. 33, except that the anisotropic heat conductive sheet 47 was used.

COMPARATIVE EXAMPLE 2

Figure 34:
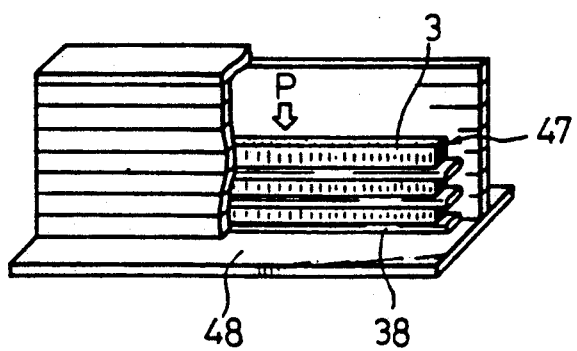
FIG. 34 is a perspective view illustrating a method of making a conventional anisotropic heat conductive sheet to a piling body.

A heat exchanger having the same structure as that of the Example 2 was manufactured by the same method as that used to manufacture Example 2 as shown in FIG. 34, except that the anisotropic heat conductive sheet 47 was used.

In the Comparative Examples 1 and 2, a value L/d was 4, X was 0.628 and Y was 1 per mm. Those values are the same as of the Examples.

Figure 35:
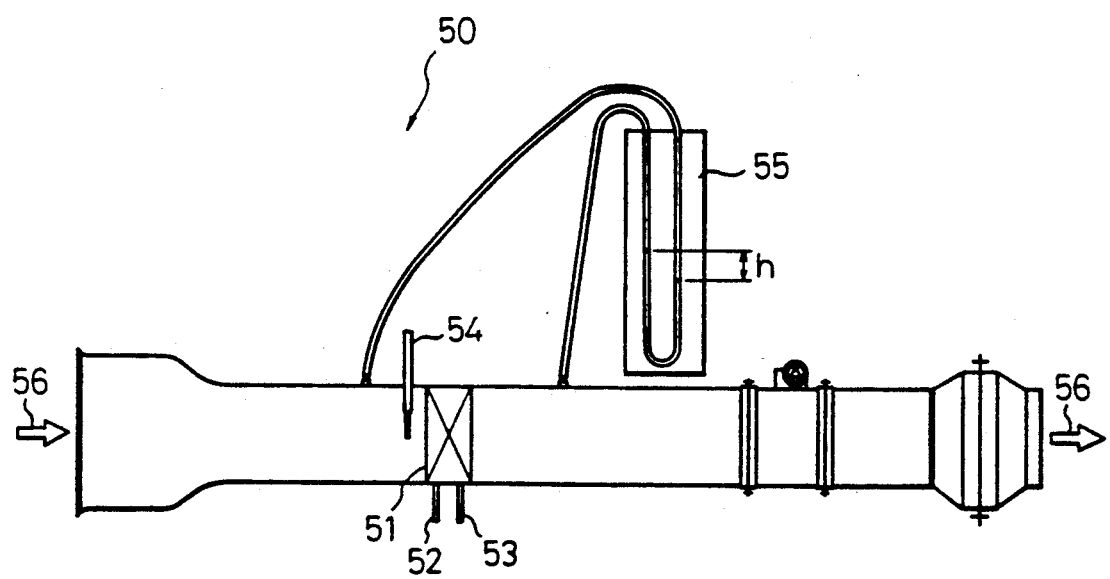
FIG. 35 is a front view illustrating a device for measuring a heat transmission ratio of the heat exchanger.

To compare the characteristics of the heat exchangers of the Examples ad the Comparative Examples, a heat exchange ratio and pressure loss were measured by a device illustrated in FIG. 35.

A cross section of a fluid passage of a heat exchanger 51 in the measuring device 50 was 300 mm ×300 mm. The air flow was calculated by an air speed measured by a hot wire anemometer 54 and the cross section. A pressure loss Δp of the heat exchanger 51 was obtained by a manometer 55 by measuring a static pressure difference between a front of the heat exchanger 51 and a back of the heat exchanger 51 in an air flow direction 56. Hot water was supplied to an inlet 52 of the heat exchanger 51 and exhausted from an outlet 53, and returned through a flowmeter (not shown) to a controller (not shown) by which the temperature of the hot water was controlled. A heat transfer quantity of the water $Q_W$ was calculated from the water flow, temperature at the inlet 52, and temperature at the outlet 53.

The heat exchange ratio K was calculated from the following equation $$K = Q_W/(A_0 \cdot \Delta Q)$$

Wherein $A_0$ stood for a total heat transfer area, and $\Delta Q$ stood for a mean temperature difference between the air and the hot water.

Table 1 shows the heat exchange ratios and pressure losses in the Examples and the Comparative Examples when the measurement is made at an air speed of 1 m/sec by the above measuring device.

TABLE 1

|  | Example 1 | Comparative Example 1 | Example 2 | Comparative Example 2 |
|---|---|---|---|---|
| Heat Exchanging Ratio | 1.18 | 1 | 1.21 | 1 |
| Pressure Loss | 1 | 1 | 1 | 1 |
| Shape of Pipe | circular | " | Flat | " |

*The numbers of Examples in Table 1 are expressed as a ratio to the measuring value of the comparative examples, i.e., 1, or 2 respectively.

We claim:

1. A method of manufacturing a pin-fin type heat exchanger having corrugated wire-like pin-fins as heat conductive elements, wherein said corrugated wire-like heat conductive elements have curved tops which are joined at least at one side to a pipe, wherein said method comprises a step of arranging a plurality of said wire-like heat conductive elements in parallel and spaced from each other, a step of temporarily fixing the plurality of wire-like conductive elements in an arrangement such that they form a sheet constituted of the wire-like heat conductive elements and a temporary fixing material, a step of shaping the sheet into a corrugated form, a step of joining the curved tops of the corrugated sheet to a pipe, and a step of removing the temporary fixing material.

2. A method according to claim 1, wherein said temporary fixing material is a resin.

3. A method according to claim 2, wherein said resin is a soluble resin.

4. A method according to claim 3, wherein said soluble resin is a substance capable of being melted by heat.

5. A method according to claim 3, wherein said soluble resin is a substance capable of being decomposed by heat.

6. A method according to claim 3, wherein said soluble resin is a substance capable of being burnt by heat.

7. A method according to claim 3, wherein said soluble resin is a substance capable of being dissolved by a chemical.

8. A method according to claim 3, wherein said soluble resin is a substance capable of being decomposed by a chemical.

9. A method according to claim 1, wherein a resin is used as the temporary fixing material, said method further including a step of removing a resin of the wire-like heat conductive material on the curved tops applied on at least a side of the corrugated sheet.

* * * * *